(12) United States Patent
Henzinger et al.

(10) Patent No.: US 6,505,505 B1
(45) Date of Patent: Jan. 14, 2003

(54) METHOD AND DEVICE FOR DETERMINING THE AMBIENT PRESSURE IN AN INTERNAL COMBUSTION ENGINE, AND AIR MASS METER THEREFOR

(75) Inventors: Ronald Henzinger, Regensburg (DE); Harald Leiderer, Wörth (DE); Hermann Leiderer, Wörth (DE); Andreas Wildgen, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 3 days.

(21) Appl. No.: 09/642,847

(22) Filed: Aug. 17, 2000

(30) Foreign Application Priority Data

Aug. 17, 1999 (DE) .......................... 199 38 899

(51) Int. Cl.⁷ ............................................ G01M 15/00
(52) U.S. Cl. ..................................... 73/118.2
(58) Field of Search ................... 116/268, DIG. 25; 73/861.42, 116, 117.2, 118.1, 118.2, 117.3

(56) References Cited

U.S. PATENT DOCUMENTS 5,597,951 A * 1/1997 Yoshizaki et al. ......... 73/118.2
5,604,306 A * 2/1997 Schricker ............. 118/DIG. 25
5,774,056 A * 6/1998 Berry et al. ................. 116/268
5,895,859 A    4/1999 Sawada et al.

FOREIGN PATENT DOCUMENTS

DE    3914784 A1    11/1990
DE    4426272 A1     1/1996
DE   19740916 A1    10/1998

* cited by examiner

*Primary Examiner*—Eric S. McCall
(74) *Attorney, Agent, or Firm*—Laurence A. Greenberg; Werner H. Stemer; Gregory L. Mayback

(57) ABSTRACT

It is possible to dispense with a separate ambient pressure sensor. For that purpose, the ambient pressure $p_u$ is determined from the absolute pressure $p_s$ in the intake tract of an internal combustion engine, the intake air mass flow rate Q and the air temperature T, as well as a pressure loss coefficient $C_b$. Calibration of the value for the ambient pressure $p_u$ determined in this way when the internal combustion engine is idling or at a standstill makes it possible to diagnose an impermissibly contaminated air filter by deducing from the change in the pressure loss coefficient $C_b$.

12 Claims, 2 Drawing Sheets

METHOD AND DEVICE FOR DETERMINING THE AMBIENT PRESSURE IN AN INTERNAL COMBUSTION ENGINE, AND AIR MASS METER THEREFOR

BACKGROUND OF THE INVENTION

Field of the Invention

The invention relates to a method and a device for determining the ambient pressure for an internal combustion engine and to an air mass meter for the device.

The ambient air pressure is evaluated by a number of control systems involved in controlling operation of an internal combustion engine. In view of this fact, there is often provided a corresponding ambient pressure sensor in a control unit.

The ambient pressure can be used, for example, to determine the degree of loading of an air filter that is connected upstream of the intake tract of the internal combustion engine. If the absolute pressure in the intake pipe downstream of the air filter is measured in front of a throttle valve, it is possible, if the pressure difference between this absolute pressure and the ambient pressure exceeds a threshold which is dependent on operating parameters, to conclude that the pressure drop at the air filter is excessive.

The ambient pressure may also be taken into account when determining the injection times.

According to the prior art, an ambient pressure pick-up is indispensable for measuring the ambient pressure. For example, German published patent application DE 44 26 272 A1 provides a pressure gauge in the intake tract and a separate ambient pressure pick-up. Both feed their measured values to a control unit which in addition is connected to a temperature sensor disposed in the intake tract.

German published patent application DE 39 14 784 A1 dispenses with the option of constant measurement and uses an absolute pressure pick-up downstream of a throttle valve in the intake tract, the value from which pick-up is read only above a minimum opening angle of the throttle valve.

SUMMARY OF THE INVENTION

The object of the invention is to provide a method and device for determining the ambient pressure at an internal combustion engine and an air mass meter therefor which overcomes the above-noted deficiencies and disadvantages of the prior art devices and methods of this kind.

With the above and other objects in view there is provided, in accordance with the invention, a method of determining an ambient pressure for an internal combustion engine, with an air mass meter in. the intake tract. The method comprises the following steps: measuring a starting or initial value for an ambient pressure, an air mass flow rate, an air temperature, and an absolute pressure in an intake tract of an internal combustion engine upstream of a throttle member in an intake air flow direction; and determining an ambient pressure prevailing outside the intake tract from the starting value for the ambient pressure, the air mass flow rate, the air temperature, and the absolute pressure.

The method according to the invention is based on the recognition that the pressure drop between an air filter and a throttle member in the intake tract of the internal combustion engine is a function of the pressure loss coefficient in the intake tract and of the air mass flow rate, the air temperature and the ambient pressure. Adding the pressure drop to the absolute pressure in the intake tract gives the ambient pressure. Therefore, there are two recommended variants for determining the ambient pressure.

Firstly, the equation which can be derived from this addition can be suitably rearranged so that the ambient pressure results as a function of the air mass flow rate, the air temperature and the pressure loss coefficient in the intake tract and of the absolute pressure in the intake tract. Secondly, it is possible to use a recursive method, in which, working on the basis of a starting value for the ambient pressure, firstly the pressure drop is calculated and from this, together with the absolute pressure in the intake tract, a new value is obtained for the ambient pressure. It is thus possible to determine the ambient pressure by recursion. The starting value may, for example, be produced by measuring the absolute pressure in the intake tract when the internal combustion engine is stationary or idling, since in these situations the absolute pressure in the intake tract substantially equates to the ambient pressure.

In accordance with an added feature of the invention, a pressure loss coefficient is taken into account, and the pressure loss coefficient is chosen in dependence on a cross-sectional area of the intake tract in a region of the air mass measurement and/or a pressure loss factor representing a flow condition in the intake tract.

In accordance with an additional feature of the invention, a pressure drop between an air filter and the throttle member in the intake tract is determined in dependence on the air mass flow rate, the air temperature, the pressure loss coefficient, and the starting value for the ambient pressure; and a new value for the ambient pressure is calculated by adding the absolute pressure in the intake tract and the pressure drop. The absolute pressure is preferably determined with the internal combustion engine at standstill or in idling.

In accordance with another feature of the invention, the pressure loss coefficient is calculated from the pressure drop, using the ambient pressure, the air mass flow rate and the air temperature, and, if a threshold is exceeded, a signal is emitted indicating a necessity to exchange the air filter upstream of the intake tract in the intake air flow direction.

In accordance with a further feature of the invention, the pressure drop is defined as a difference between ambient pressure and absolute pressure in the intake tract. In the alternative, the pressure drop is directly present.

In accordance with again an added feature of the invention, the pressure loss coefficient is calculated with the equation $$C_b = \Delta p \cdot \frac{p_u}{Q^2 T},$$

where $C_b$ is the pressure loss coefficient, $p_u$ is the ambient pressure, $\Delta p$ is a pressure drop, Q is the air mass flow, and T is the air temperature.

In accordance with again an additional feature of the invention, the starting value is the absolute pressure in the intake tract, which equates to the ambient pressure;

the absolute pressure is continuously recorded during a subsequent start-up; and the pressure loss coefficient is calculated with the equation $$C_b = (p_u - p_s) \cdot \frac{p_u}{Q^2 T},$$

where $C_b$ is the pressure loss coefficient, $p_u$ is the ambient pressure, $p_s$ is the absolute pressure, Q is the air mass flow rate, and T is the air temperature in the intake tract;

the pressure loss coefficient $C_b$ is stored in a characteristic diagram as a function at least of the air mass flow rate Q, which represents an operating parameter of the internal combustion engine; and during further determination of the ambient pressure $p_u$, values of the characteristic diagram as a function of operating parameters are taken into account for the pressure loss coefficient $C_b$.

With the above and other objects in view there is also provided, in accordance with the invention, a device for determining an ambient pressure for an internal combustion engine with an intake tract, comprising:

an air mass meter in an intake tract of an internal combustion engine;

an absolute pressure pick-up connected to the air mass meter;

a temperature sensor;

a control unit connected to the air mass meter, to the absolute pressure pick-up, and to the temperature sensor, the control unit being configured to determine an ambient pressure $p_u$ in accordance with the method according to claim 1, without an ambient pressure pick-up.

There is also provided, in accordance with the invention, an air mass meter for the above-outlined device. The novel air mass meter comprises:

a housing attached to the intake tract of the internal combustion engine and communicating therewith through a passage connecting the housing to the intake tract for pressure compensation purposes;

an air mass sensor mounted at the housing and projecting into the intake tract; and an absolute pressure sensor.

In accordance with yet another feature of the invention, the housing has an electrics housing which houses the absolute pressure sensor and including a connector, providing electrical contact with the air mass sensor and the absolute pressure sensor.

In accordance with yet an added feature of the invention, the housing includes a section of pipe configured to fit into the intake tract, enclosing the air mass sensor, and supporting the electrics housing, and wherein the passage connects the electrics housing to the section of pipe.

In accordance with a concomitant feature of the invention, a circuit board is supported on a base of the electrics housing, the circuit board supporting the absolute pressure sensor and the air mass sensor being connected to the circuit board, and a layer, applied in liquid form and hardened, disposed on the circuit board for pressure transfer and for protecting the absolute pressure sensor, the circuit board, the absolute pressure sensor, and the connection wires, and wherein a connection piece is formed at the passage for preventing a material of the layer from being able to pass into the passage before the material cures.

In other words, the device according to the invention provides an air mass meter between an air filter and a throttle member in the intake tract, in which there is an absolute pressure pick-up and an air temperature sensor in the intake tract, which are connected to a control unit which, when carrying out the method according to the invention, no longer has to have recourse to an ambient pressure signal in order to calculate the ambient pressure.

The air mass meter according to the invention for this device has the air mass sensor and an absolute pressure sensor in a housing, so that the essential components of the device are produced in a compact, simple component which is inexpensive to produce. Furthermore, this air mass meter has the additional advantage that cabling and plug connections, which represent relatively expensive components, are simplified.

The pressure loss coefficient in the intake tract is decisively characterized by the pressure drop at the air filter. The loading of the air filter is substantially responsible for the pressure drop. However, this loading only varies slowly with respect to ambient pressure. Furthermore, the level of loading of the air filter does not have any effect on the air pressure in the intake tract if there is no or virtually no air mass flow being sucked in. This is the case when the internal combustion engine is at a standstill or idling.

It is thus possible for the pressure loss coefficient which is used in the calculation of the pressure value in accordance with the first variant to be calibrated or determined by means of an absolute pressure measurement in the intake tract when the internal combustion engine is at a standstill or idling. Once this value has been determined, it can then be used to carry out the rest of the method.

If the pressure loss coefficient exceeds a predetermined threshold, it is possible to draw the conclusion that the air filter is too strongly loaded, i.e. is causing an excessive pressure drop.

The invention therefore has the advantage that it is possible to dispense with a separate ambient pressure pick-up in order to determine the ambient pressure. Furthermore, it is possible to determine the level of loading of the air filter and thus to establish when it needs to be exchanged.

Other features which are considered as characteristic for the invention are set forth in the appended claims.

Although the invention is illustrated and described herein as embodied in a method and device for determining the ambient pressure in an internal combustion engine, and air mass meter therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
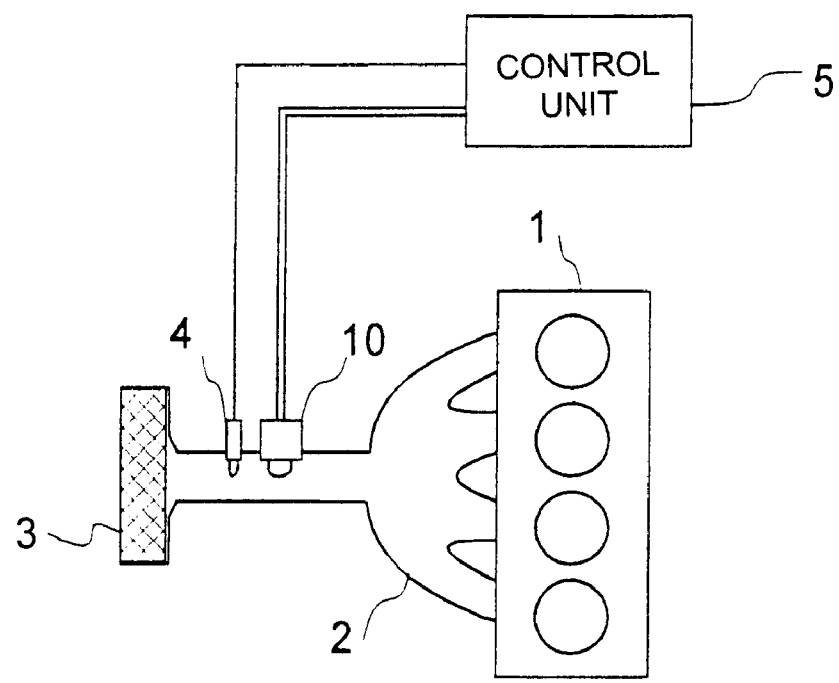
FIG. 1 is a diagrammatic view of an internal combustion engine with a device for determining the ambient pressure.

Referring now to the figures of the drawing in detail and first, particularly, to FIG. 1 thereof, there is seen an internal combustion engine 1 with a device for determining the ambient pressure. Only the components which are essential to understanding the invention are included in the drawing. The internal combustion engine 1 has an intake tract 2, here an intake pipe into an intake manifold. Upstream of the intake tract, in the intake air flow direction, there is disposed an air filter 3. A temperature sensor 4 is disposed in the intake tract 2 for measuring the temperature of the intake air. The temperature sensor 4 outputs its signal to a control unit 5. The latter may, for example, be an engine control unit ECU which controls the entire operation of the internal combustion engine 1. As an alternative, the temperature sensor 4 may also measure the air outside the intake tract 2, in which case it should be ensured that the internal combustion engine 1, which heats up during operation, does not cause any distortion to the measurement. Furthermore, an air mass meter 10 is arranged in the intake tract 4. The air mass meter records both an intake air mass flow rate Q and an absolute pressure $p_s$ in the intake tract 2. The air mass meter 10 is connected to suitably communicate its output signals representing its measured values to the control unit 5. As an alternative, the temperature sensor 4 may also be integrated in the air mass meter 10.

The control unit is configured to carry out or initiate the methods to be described in the following.

Figure 2:
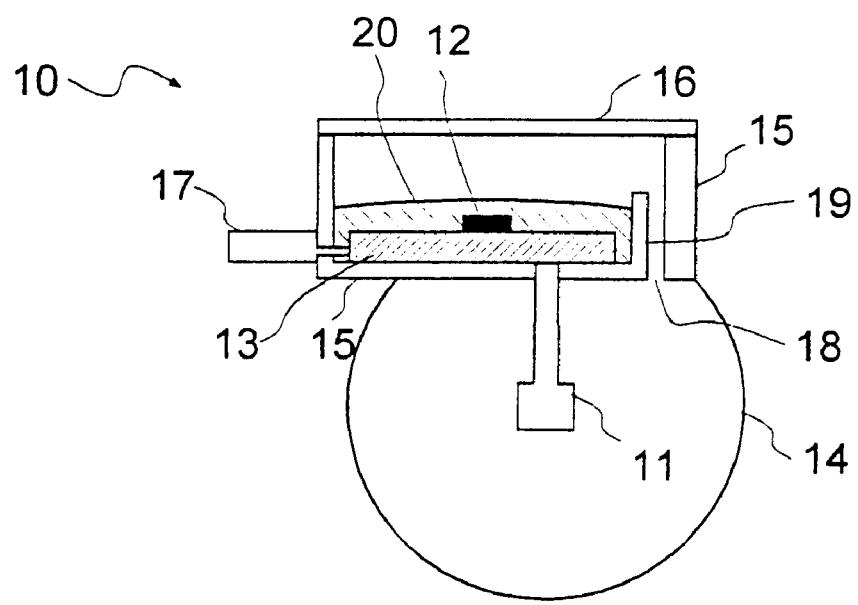
FIG. 2 is a diagrammatic section taken through an air mass meter.

A preferred configuration of the air mass meter 10 is shown in more detail, in a diagrammatic sectional view, in FIG. 2. The air mass meter 10 has a section of pipe 14 which is fitted into the intake tract 2. In the section of pipe 14 there is disposed an air mass sensor 11. This sensor may, for example, be a hot wire or hot film sensor. An electrics housing, which comprises a housing bottom part 15 with housing cover 16, is attached to the section of pipe 14. The air mass sensor 11 is arranged on the housing bottom part 15. The interior of the electrics housing is connected to the interior of the section of pipe 14 by a passage 18, which may be designed, for example, as a bore. In the housing bottom part 15 there is a circuit board 13 to which the air mass sensor 11 is also connected. The circuit for activating and reading the air mass sensor 11 is situated on the circuit board 13. An absolute pressure sensor 12 and the circuit required therefor are also disposed on the circuit board 13. The circuit board 13 is connected to a connector 17, via which the signal lines run to the control unit 5. The circuit board 13 with the absolute pressure sensor 12 is covered by a layer 20 which may, for example, be of silica gel. The layer 20 is applied in liquid form and is then set. To ensure that this layer 20 cannot pass through the passage 18, there is provided a suitable connection stub 19 at the passage 18. The layer 20 is used to protect the circuit board 13 and the absolute pressure sensor 12, as well as the lines leading to the connector 17, from the harmful effects of the intake air flowing through the section of pipe 14. At the same time, the layer 20 is designed in such a way that it transmits the pressure in the interior of the electrics housing, which is coupled to the pressure of the section of pipe 14 via the passage 18. Since the absolute pressure sensor 12 beneath the layer 20 is directly—i.e., without a diaphragm or the like—connected to the section of pipe 14 fitted in the intake tract 2, it is possible for the absolute pressure sensor 12 to exactly record the absolute air pressure in the intake tract 4. Naturally, a conventional diaphragm can also be used in the passage 18. To ensure that liquids which have entered or condensed from the housing 15, 16 can run out, the air mass meter 10 is fitted in a suitable position. The suitable position is rotated through approximately 90° to the right with respect to the illustration shown in FIG. 2.

Downstream of the air mass meter 10, in the intake tract 2 of the internal combustion engine 1, there is provided a non-illustrated throttle member. Depending on the position of the throttle member, which may, for example, be a throttle valve—although adjustment by means of a variable inlet valve lift of the internal combustion engine 1 is also possible—a different air mass flow rate Q flows through the air mass meter 10. In an internal combustion engine without throttling, for example in a direct-injection lean-burn internal combustion engine, the air mass flow rate Q is determined by the operating parameters of the internal combustion engine 1. Therefore, to this extent the nature of throttling is not important.

The pressure drop which is established in the intake tract 2 can be determined using the following equation:

$$\Delta p = C_F \cdot \frac{\rho}{2} \cdot v^2 \quad (1)$$

In this equation, $\Delta p$ is the pressure drop, $C_F$ is a pressure loss factor which represents the geometry of the intake tract, $\rho$ is the density of the intake air and v is its flow velocity. The expression for the density $\rho$ can be replaced by the following equation:

$$\rho = \frac{p_u}{R \cdot T} \quad (2)$$

In this equation, R is the gas constant ($R_{air}$=287 J/kgK), T is the air temperature, and $p_u$ is the ambient pressure. Furthermore, the velocity v is given by the air mass flow rate as follows:

$$v = \frac{Q}{\rho \cdot A} \quad (3)$$

In this equation, Q is the air mass flow rate and A is the cross-sectional area of the air mass meter 10. If the expressions of equations (3) and (2) are incorporated into equation (1), the result, with $C_b = C_F \cdot R/(2A^2)$, is:

$$\Delta p = C_b \cdot T \cdot \frac{Q^2}{p_u} \quad (4)$$

From this pressure drop, the ambient pressure $p_u$ can be determined from the absolute pressure $p_s$ in the intake tract 2 by addition:

$$p_u = p_s + \Delta p \quad (5)$$

This equation offers two possibilities for determining the ambient pressure. These two variants will now be explained with reference to the flow diagrams shown in FIGS. 3 and 4.

1. Before beginning a recursion in accordance with FIG. 3, a starting value for the ambient pressure $p_u$ is calculated in step S1. This starting value can be obtained, for example, by recording the absolute pressure $p_s$ in the intake tract 2 when the internal combustion engine is at a standstill or in idling mode. Because the air mass flow rate Q then disappears or is very low, it is immediately obvious from equation (5) or (4) that the absolute pressure in the intake tract $p_s$ is then substantially equal to the ambient pressure $p_u$.

The air mass flow rate Q and the air temperature T are measured in step S2.

In step S3, equation (4) is used to calculate the pressure drop $\Delta p$, with the starting value for the ambient pressure which is obtained from step S1 being introduced into the calculation. A value which has been stored in a memory of the control unit can be used for the pressure loss coefficient $C_b$. The pressure loss coefficient $C_b$ will be dealt with in more detail below.

The absolute pressure $p_s$ in the intake tract 4 is measured in step S4.

In step S5, equation (5) is used to calculate a new value for the ambient pressure $p_u$ from the pressure drop $\Delta p$ and the absolute pressure $p_s$. This value is used for the next recursion step, for which it is necessary to jump back to step S2.

Figure 3:
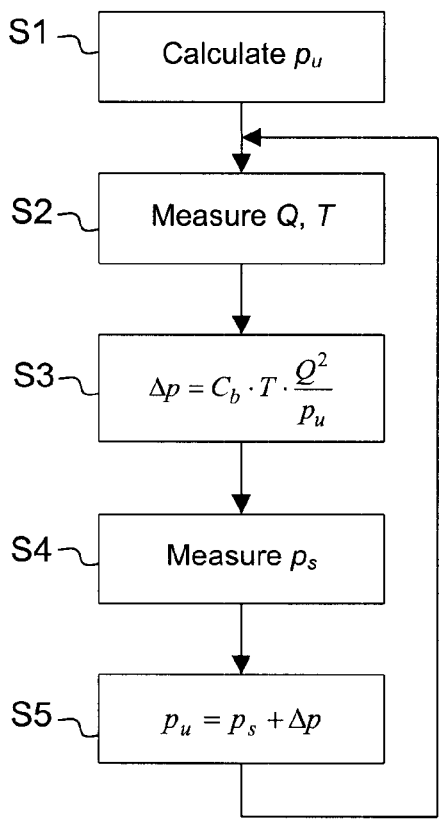
FIG. 3 is a flow diagram illustrating a first method of determining the ambient pressure.
Figure 4:
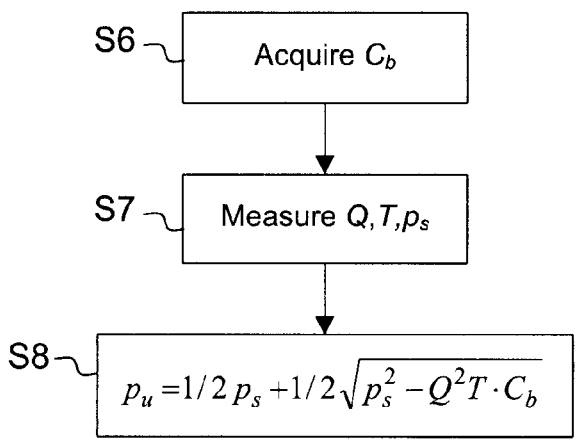
FIG. 4 is a flow diagram illustrating a second method of determining the ambient pressure.

The variant of determining the ambient pressure illustrated in FIG. 3 provides the advantage that only simple calculation operations (additions, multiplications and divisions) have to be carried out.

2. Instead of the above recursive method, the ambient pressure can also be determined by the method shown in the block diagram given in FIG. 4. For this purpose, firstly in step S6 the pressure loss coefficient $C_b$ is read from the memory. The pressure loss coefficient $C_b$ will be dealt with in more detail below.

Next, in step S7 the air mass flow rate Q and the air temperature T and the absolute pressure $p_s$ in the intake tract are measured.

Then, in step S8, the ambient pressure $p_u$ is calculated according to a revised version of equation (5):

$$p_u = \tfrac{1}{2} p_s + \tfrac{1}{2}\sqrt{p_s^2 - Q^2 T \cdot C_b} \tag{6}$$

In both variants of the determination of the ambient pressure $p_u$, the pressure loss coefficient $C_b$ is introduced into the equation used. Since the pressure loss coefficient $C_b$ is essentially determined by the pressure loss at the air filter 3, which is dependent on the loading level of the air filter 3, which only changes slowly, it can be assumed that the pressure loss coefficient $C_b$ will only change very slowly with respect to the ambient pressure $p_u$. To enable the current pressure loss coefficient $C_b$ to be determined, the ambient pressure $p_u$ is determined when the internal combustion engine is in idling mode or at a standstill, since in this situation the absolute pressure $p_s$ in the intake tract 2 is substantially equal to the ambient pressure $p_u$. The current value of the pressure loss coefficient $C_b$ can then be determined by comparing the calculated and measured ambient pressure $p_u$.

If this value exceeds a threshold, it is safe to draw the conclusion that the air filter 3 is excessively contaminated.

Theoretically, the pressure loss coefficient $C_b$ is independent of operating parameters of the internal combustion engine 1. If, in practice, it is impossible to rule out such dependency, for example as a result of transitions between laminar and turbulent flow, it is possible, before starting the internal combustion engine 1, to measure the absolute pressure $p_s$ in the intake tract 2, which equates to the ambient pressure $p_u$. When the internal combustion engine 1 is started up immediately afterward, it is possible, using $$p_u = p_a \Delta p$$

and equation (4), to determine $C_b$, as a function of operating parameters, e.g. the air mass flow rate Q, by continuous measurement of $p_s$ and to record this in a characteristic diagram. These values of $C_b$ from the characteristic diagram can then be used for determining the ambient pressure $p_u$ using one of the above variants.

Finally, the pressure loss $\Delta p$ in idling mode can also be exactly calculated by means of the value of $C_b$ obtained in this way or from the value for $p_u$ measured before start-up, so that in this way it is possible to detect a change in the pressure loss coefficient $C_b$ in idling phases.

Furthermore, the air temperature T is included in all the calculations. It is therefore necessary to enable the air temperature T to be measured with the same dynamics as the air mass flow rate Q. However, this is not possible with some current temperature sensors. Preferably, therefore, the method for determining the ambient pressure should be interrupted for brief periods in those operating phases in which experience has shown that there is a rapid temperature change. This is the case, for example, when driving off after a period of hot idling, if the internal combustion engine after phases of high load has been operated for a period with little cooling (motor vehicle at a standstill), and then the cooling capacity rises once more (motor vehicle starts moving again). Furthermore, because the air filter loading only changes slowly, a certain level of filtering is possible to the extent that sudden changes in the pressure loss coefficient $C_b$ can be rejected. A time constant of several days is generally sufficient for the determination. Such sudden changes in the pressure loss coefficient $C_b$ may result, for example, when an internal combustion engine 1 which drives a motor vehicle is operated in heavy rain, for example if the air filter becomes wet during a journey, with the result that the pressure drop which it causes is considerably increased. Such changes should be rejected in the filtering.

We claim:

1. A method of determining an ambient pressure for an internal combustion engine, which comprises:

measuring an initial value for an ambient pressure when the internal combustion engine is idling or not running; and determining an ambient pressure prevailing outside the intake tract from the initial value for the ambient pressure, an air mass flow rate, an air temperature, and an absolute pressure in an intake tract of an internal combustion engine upstream of a throttle member in an intake air flow direction, when the internal combustion engine is running.

2. The method according to claim 1, wherein the measuring step comprises measuring the air mass flow rate with an air mass meter in the intake tract of the internal combustion engine.

3. The method according to claim 1, wherein the determining step comprises taking a pressure loss coefficient into account, and choosing the pressure loss coefficient in dependence on one of a cross-sectional area of the intake tract in a region of the air mass measurement and a pressure loss factor representing a flow condition in the intake tract.

4. The method according to claim 3, which comprises:

determining a pressure drop between an air filter and the throttle member in the intake tract in dependence on the air mass flow rate, the air temperature, the pressure loss coefficient, and the initial value for the ambient pressure; and calculating a new value for the ambient pressure by adding together the value of the absolute pressure in the intake tract and the value of the pressure drop.

5. The method according to claim 1, which comprises obtaining the initial value of the ambient pressure by measuring the absolute pressure when the internal combustion engine is at a standstill.

6. The method according to claim 1, which comprises obtaining the initial value of the ambient pressure by measuring the absolute pressure when the internal combustion engine is idling.

7. The method according to claim 1, which comprises calculating a pressure loss coefficient from a pressure drop, using the ambient pressure, the air mass flow rate and the air temperature, and, if a threshold is exceeded, emitting a signal indicating a necessity to exchange an air filter upstream of the intake tract in the intake air flow direction.

8. The method according to claim 7, wherein the pressure drop is defined as a difference between ambient pressure and absolute pressure in the intake tract.

9. The method according to claim 7, wherein the pressure drop is determined in dependence on the air mass flow rate, the air temperature, the pressure loss coefficient, and the initial value for the ambient pressure.

10. The method according to claim 7, which comprises calculating a pressure loss coefficient with the equation $$C_b = \Delta p \cdot \frac{p_u}{Q^2 T},$$

where $C_b$ is the pressure loss coefficient, $p_u$ is the ambient pressure, $\Delta p$ is a pressure drop, Q is the air mass flow, and T is the air temperature.

11. The method according to claim 1, which comprises:
measuring a value of the absolute pressure in the intake tract when the combustion engine is not running, which equates to the initial value of the ambient pressure;
continuously recording the absolute pressure during a subsequent start-up and running of the combustion engine; and
calculating the pressure loss coefficient with the equation $$C_b = (p_u - p_s) \cdot \frac{p_u}{Q^2 T},$$

where $C_b$ is the pressure loss coefficient, $p_u$ is the ambient pressure, $p_s$ is the absolute pressure, Q is the air mass flow rate, and T is the air temperature in the intake tract;
storing the pressure loss coefficient $C_b$ in a characteristic diagram as a function at least of the air mass flow rate Q, which represents an operating parameter of the internal combustion engine; and
during further determination of the ambient pressure $p_u$, taking values of the characteristic diagram as a function of operating parameters into account for the pressure loss coefficient $C_b$.

12. A device for determining an ambient pressure for an internal combustion engine with an intake tract, comprising:
an air mass meter in an intake tract of an internal combustion engine;
an absolute pressure pick-up connected to said air mass meter;
a temperature sensor; and
a control unit connected to said air mass meter, to said absolute pressure pick-up, and to said temperature sensor, said control unit being configured to determine an ambient pressure $p_u$ in accordance with the method according to claim 1, without an ambient pressure pick-up measuring the ambient pressure.

* * * * *